(12) United States Patent
Itoh et al.

(10) Patent No.: US 7,886,509 B2
(45) Date of Patent: Feb. 15, 2011

(54) LOAD-RESPONSIVE ENERGY-SAVING MOTOR-DRIVEN GRASS MOWER

(75) Inventors: Kazuo Itoh, Kasai (JP); Mitsuo Inoue, Hyogo (JP); Masayuki Shimoda, Himeji (JP)

(73) Assignee: Itoh Denki Co., Ltd. (JP)

( * ) Notice: Subject to any disclaimer, the term of this patent is extended or adjusted under 35 U.S.C. 154(b) by 149 days.

(21) Appl. No.: 11/895,865

(22) Filed: Aug. 28, 2007

(65) Prior Publication Data

US 2008/0110148 A1 May 15, 2008

(30) Foreign Application Priority Data

Nov. 14, 2006 (JP) ............... 2006-307637

(51) Int. Cl.
*A01D 41/14* (2006.01)

(52) U.S. Cl. .............. 56/10.2 R; 30/276; 318/434

(58) Field of Classification Search .......... 56/10.3, 56/11.9, 10.2 R, 10.8, DIG. 15, 10.5; 318/798, 318/805, 430–434, 443–445, 469; 30/276
See application file for complete search history.

(56) References Cited

U.S. PATENT DOCUMENTS

| | | | | |
|---|---|---|---|---|
| 2,855,556 | A * | 10/1958 | Carp | 318/443 |
| 3,973,378 | A * | 8/1976 | Bartasevich et al. | 56/11.9 |
| 4,503,371 | A * | 3/1985 | Sugita | 318/443 |
| 4,634,944 | A * | 1/1987 | Hastings et al. | 318/443 |
| 4,865,172 | A * | 9/1989 | Sommer | 477/7 |
| 5,619,845 | A | 4/1997 | Bruener et al. | |
| 5,937,622 | A | 8/1999 | Carrier et al. | |
| 6,170,241 | B1 * | 1/2001 | Shibilski et al. | 56/11.9 |
| 6,791,289 | B1 * | 9/2004 | Long et al. | 318/444 |
| 6,886,317 | B2 * | 5/2005 | Jackson et al. | 56/298 |
| 2005/0072132 | A1 * | 4/2005 | Dettmann | 56/10.8 |
| 2006/0196159 | A1 * | 9/2006 | Daly et al. | 56/7 |

FOREIGN PATENT DOCUMENTS

| | | |
|---|---|---|
| DE | 41 36 197 | 5/1993 |
| DE | 297 24 791 | 4/2004 |
| EP | 0 941 650 | 9/1999 |
| EP | 1 645 456 | 4/2006 |
| JP | 2525820 | 1/1993 |
| JP | 7-36611 | 7/1995 |
| WO | WO 01/70009 | 9/2001 |

OTHER PUBLICATIONS

European Search Report (Feb. 18, 2008, Munich) Application No. EP 07 01 6516.

* cited by examiner

*Primary Examiner*—Thomas B Will
*Assistant Examiner*—Mai T Nguyen
(74) *Attorney, Agent, or Firm*—Wood, Phillips, Katz, Clark & Mortimer

(57) ABSTRACT

A power-driven grass mower includes an operation division having a grass cutter; a motor division having an electric motor and a power-source division having a battery, wherein the operation division is provided with a first means for watching if the motor division is locked for some reason or other, and a second means for putting the motor division into the inching operation in response to any signal from the first means indicating that the motor division is in a locking condition.

17 Claims, 3 Drawing Sheets

LOAD-RESPONSIVE ENERGY-SAVING MOTOR-DRIVEN GRASS MOWER

TECHNICAL FIELD

The present invention relates to a grass mower, and more particularly, to a motor-driven grass mower capable of adjusting the consumption of electricity in response to the load applied to the cutter of the grass mower.

BACKGROUND ART

Power-driven grass mowers capable of cutting grass with a rotary circular blade or cutter are very popular not only in domestic gardens but also in agricultural fields. This type of power-driven grass mower is commonly equipped with a small engine. However, the use of an engine is noisy. Noise in the residential areas is likely to cause a nuisance which is condemned as a typical public hazard. In addition, the engine-operated mower violently vibrates, thereby making it difficult for elders, women and children to use it. Even for men, the violent vibration can be a problem when the mower is used for a long period of hours, especially in agricultural fields. In recent years, motor-driven grass mowers are employed in place of engine-driven grass mowers.

A motor-driven grass mower requires an electric power source, and the commercially available motor-driven grass mowers use a commercial electric power source, wherein the mower is connected to the power source through an electric plug. The mower must be equipped with an electric wire in order to receive a current supply from the power source, and the wires must be long enough to enable the mower to work in areas distant from the power source, and move around here and there in a vast field. However, it often happens that the wires are inadvertently cut by the rotary blade of the mower while it moves around.

In order to eliminate the wire-cut troubles occurring while the mower is in operation, a battery has been replaced by the commercial power source. Examples are disclosed in Japanese Utility Model Laid-open Application No. 1995/36611 (Reference (1)) and Utility Model Registration No. 2,525,820 (Reference (2)).

The grass mowers disclosed in References (1) and (2) are driven by motor, and the torque of the motor is transmitted to the rotary cutter. The motors of these grass mowers rotates at constant speed irrespective of a load applied to the cutter.

In general, the trouble arises in the power-driven grass mowers: in the case of engine-driven mowers, while it is cutting grass, the cut pieces are likely to be caught in the rotating cutter; as a result, the cutter are locked or stopped from rotating. In this situation, the built-in clutch is disengaged, thereby causing the engine to idle. The presence of the clutch is advantageous in keeping the machine parts from becoming damaged.

On the contrary, in the case of motor-driven grass mower, the torque of the motor is directly to the cutter with no clutch interposed in the power transmission passage. Therefore, when the cutter is locked for some reason or other, the motor is forced to stop. Nevertheless, the motor continues to receive the supply of electric current. The electricity excessively builds up in the motor under the electrical characteristics of the motor. As a result, the battery is rapidly consumed for no purpose. The sooner the battery is consumed, the shorter the working hours become.

Accordingly, the primary object of the present invention is to save electricity if the cutter is locked for some reason or other.

SUMMARY OF THE INVENTION

A first version of grass mower embodying the present invention includes an operation division in which a grass cutter such as a rotary cutter, and an ancillary, and a motor division in which an electric motor is accommodated to drive the operation division, a detector for watching if the operation division is in smooth operation, so that if the detector has watched any abnormality occurring in the operation division, such as the cutter being caught in cut pieces of grass, the motor is caused to inch.

According to this version, if the cutter are locked for some reason, such as entangled in cut pieces of grass, the supply of electric current to the motor becomes intermittent, thereby minimizing the consumption of electricity. An additional advantage is that the cut pieces of grass caught in the cutter are likely to slip off under the vibration of the operation division.

A second version of grass mower is additionally provided with a means for causing the motor to keep on inching over the period of time when the cutter are locked, thereby making the motor ready for regular operation possibly resumed when the torque of the rotary cutter has overcome the locking of the cutter.

According to a third version of the embodiment, the grass mower is additionally provided with another means for stopping the motor when the locking conditions persistently continue irrespective of the inching of the motor.

According to a fourth version of the embodiment, the grass mower is additionally provided with a means for driving the motor at such an interval of time as to enable the operator to feel the motor inching, thereby enabling the operator to identify an abnormality caused by cut pieces of grass caught in the cutter.

The advantage in common with the above-mentioned embodiments is that the power supply is immediately suspended in response to the detection of the cutter being locked by cut pieces of grass, thereby preventing the battery from consuming for no purposes. As a result, the battery lasts for a long time. This contributes to the energy saving as a whole.

DESCRIPTION OF THE PREFERRED EMBODIMENTS

Figure 1:
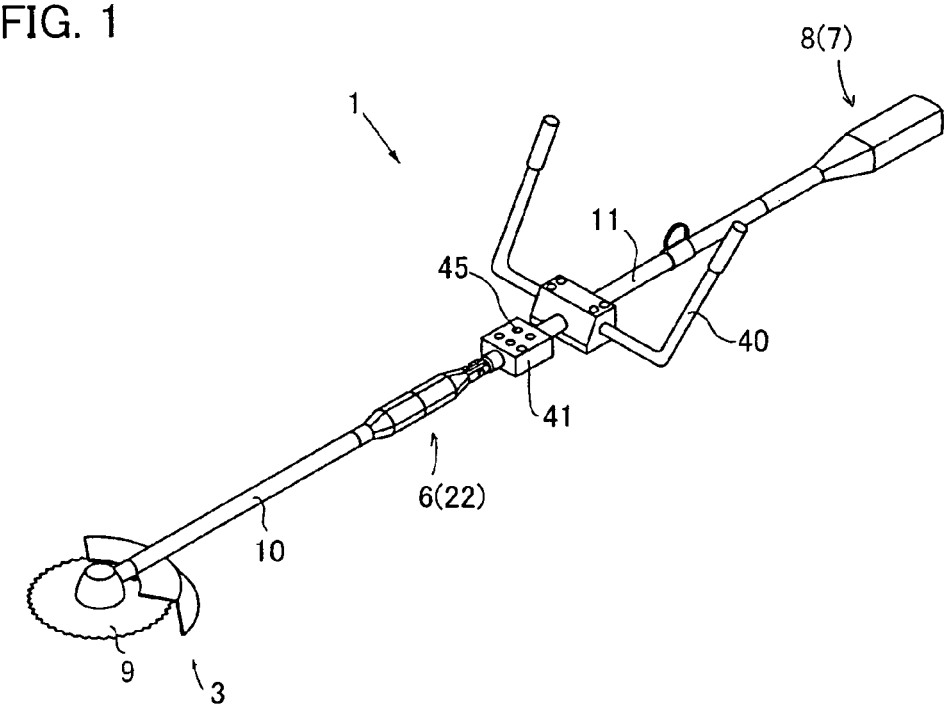
FIG. 1 is a perspective view showing a first version of grass mower embodying the present invention.
Figure 2:
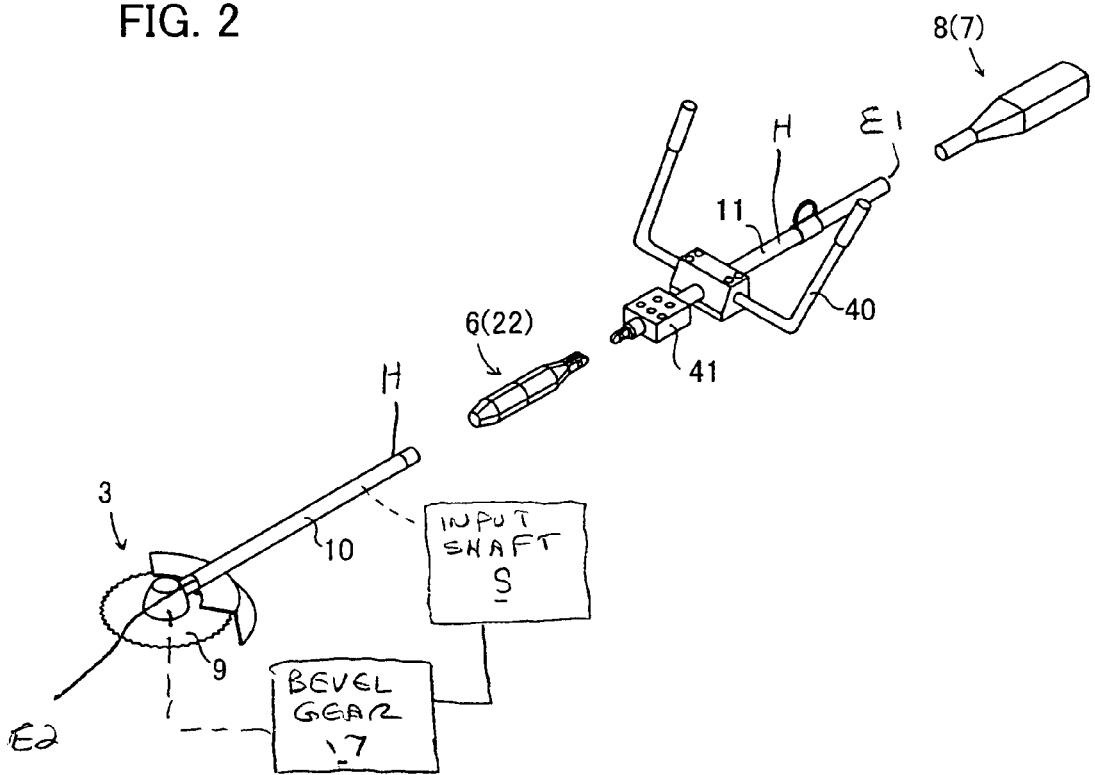
FIG. 2 is a perspective exploded view of the grass mower of FIG. 1.

Referring to FIGS. 1 to 2, the first version of grass mower embodying the present invention will be described:

The preferred form of grass mower 1 is portable, to be lifted and repositioned by a user during operation, and includes an operation division 3 housing a disc-shaped rotary cutter 9, a motor division 6 housing a motor and its ancillary, and a power-source division 8 housing a battery 7. An operating lever/housing H is divided into a front operating lever/housing part (hereinafter, "front lever") 10 and a rear operating lever/housing part (hereinafter, "rear lever") 11.

The front lever 10 houses a power-transmission shaft S, and is connected to the operation division 3 housing a known bevel gear whose input side is connected to the power-transmission shaft S. The bevel gear 17 causes the power-transmission shaft to vary its rotational direction to 45 °.

The housing has an overall elongate shape between spaced ends E1, E2 with the operation division 3 at one end E2 and the power-source division 8 at the other end E1.

The motor division 6 is actually a motor itself accommodated in a rigid shell 22 housing a rotor and a stator fixed directly on the inside wall of the shell 22, wherein the rotor and the shifter are omitted from the illustration. The motor is preferably a brushless motor.

The rear lever 11 is provided with an operating handle 40, and a controller 41 in the middle thereof. The controller 41 includes a switch 45 for changing from one operation mode to another; more specifically, the light-load mode, the heavy-load mode, and the energy-saving mode, each of which modes will be more particularly described below. The operation handle 40 is provided with an operating switch (not shown).

The rear lever 11 is detachably provided with a power-source division 8 housing a battery 7 at its rear end. The power-source division 8 is detached in according to the kinds of the work, and the battery 7 is replaced with another having a required capacity and voltage.

The controller 41 is provided with a known pressure detector (not shown) so as to monitor the source voltage to be input from the power-source 8. The control mode is appropriately switched in response to the detection of the source voltage, thereby supply an adequate amount of power to the motor division 6. For example, suppose that the power-source division 8 is a built-in lithium battery having two stages of circuits in series, the power-supply voltage will be about 6 to 9 volts. If the power-source division 8 is a built-in lithium battery having four stages of circuits in series, the power-supply voltage will be about 12 to 18 volts. If the power-source division 8 is a built-in nickel-hydrogen battery having ten stages of circuits in series, the power-supply voltage will be about 12 volts. If the power-source division 8 is a built-in nickel-hydrogen battery having twenty stages of circuits in series, the power-supply voltage will be about 24 volts. The controller 41 monitors the voltage varying with the capacity of the battery, thereby supplying a power of adequate capacity to the motor division 6. When the battery voltage is high, a higher voltage is applied to the motor division 6, but the voltage is not proportional to the voltage at the power-source division 8.

The modes in which the grass mower of the invention is operated will be described:

The modes include three modes; that is, a light-load mode, a heavy-load mode, and an energy-saving mode. The light mode is used when the mower is employed on a soft ground like lawn, where the motor division 6 receives a low voltage, with a lowest possible upper limit of the current supply. In this mode the cutter slowly rotates.

The heavy-load mode is used when the mower is to cut grass having stiff stalks, where a high voltage is applied to the motor division 6. As result, the cutter rotates at high speed at a current with a highest possible upper limit. In this case, the power-source division 8 is preferably replaced with an adequate power-source.

The energy-saving mode is a mode in which the current is intermittently supplied to the motor-division 6; more particularly, the current is supplied at a predetermined cycle, or in other words, a pulsating voltage is applied to the motor division 6. In this mode, the motor division 6 rotates at intervals, but the cutter 9 functions as a balance wheel and can rotate at a constant speed under its own momentum. In this mode the load is constantly monitored; more particularly, the current supplied to the motor division 6 is constantly measured. The variations in the load are identified indirectly through the measured current values.

One advantage is that with an increase in the load inflicted by the grass mower, the power-supplying time is prolonged per hour; for example, by increasing the pulse width without changing the frequency, or alternatively, by shortening the pulse intervals without changing the pulse width. In this way, the energy-saving mode allows the power-supply to become intermittent, and changes the voltage at the source, thereby avoiding wasting energy. Another advantage is that even when the cutter is suddenly stopped by an unexpected obstacle, the motor is protected from being damaged.

Figure 3:
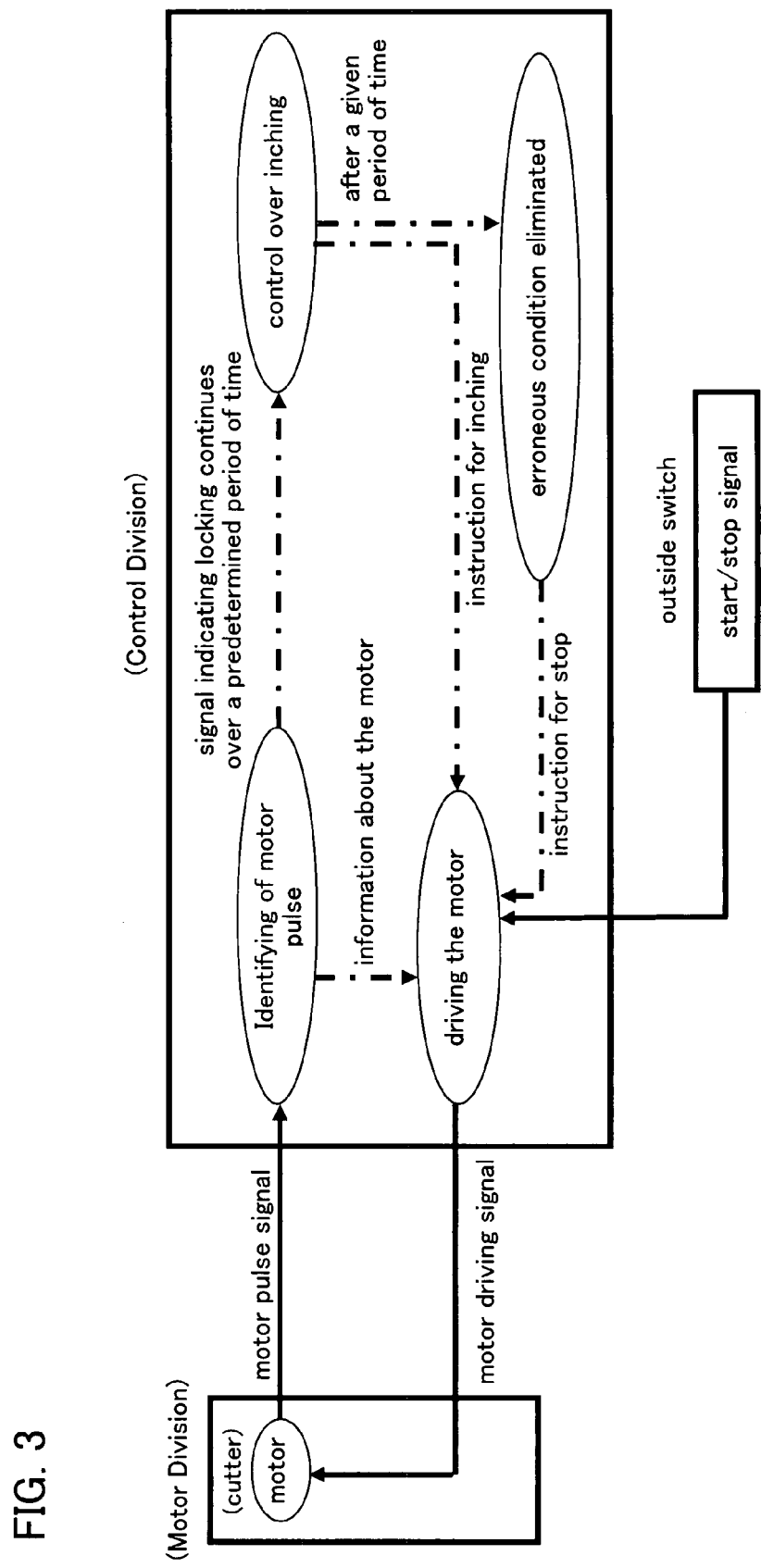
FIG. 3 is a block diagram illustrating the electrical structure of the grass mower of FIG. 1.

In the over-load state, such as when the cutter is completely stopped by being tangled with a twig, the power-supplying time is shortened per hour, thereby protecting the motor from being burnt out, and also avoiding consuming the battery wastefully. In short, in the over-load mode the regular operation mode is shifted to the inching mode, the detail of which will be described:

FIG. 3 clearly indicates that the motor division 6 and the control division (i.e. the motor pulse identifying circuit) are electrically separated. These divisions will be more specifically described are as follows:

The motor division 6 is preferably composed of a brushless motor, whose rotations per minute (r.p.m.) can be detected or measured through the number of pulses generated by the motor and represented as a pulse signal. This pulse signal, indicating the r.p.m. (rotational speed) of the motor 6, is input to the control division. This system helps the operator readily know that the motor 6 is locked if no pulse signal comes from the motor 6 or excessively few pulses received by the motor 6 per hour. The motor 6 incorporated in the grass mower of the invention has the function of transmitting a pulse signal in accordance with the r.p.m. of the motor 6, and the control division receives it. In turn, the control division transmits a driving signal to the motor 6; if the control division receives no pulse signal from the motor 6, the motor 6 is acknowledged as being locked for some reason or other. In this way, the control division functions as a lock inspector.

The brushless motor includes a Hall element etc. to identify the position of the rotor. The motor pulse signal can be output from the Hall element.

Referring to FIG. 3, the control division includes a motor pulse identifying circuit, a motor driving circuit, an inching control circuit, and an emergency stop circuit. Alternatively, these circuits can be replaced by software installed in the computer. The motor pulse identifying circuit receives a motor pulse signal transmitted by the motor 6, and counts the number of pulses that the pulse signal represents to check if the motor is locked or not. The identifying circuit also detects the r.p.m. of the motor.

The motor driving circuit transmits a driving signal to the motor 6 in response to the signal representing the current rotations per minute of the motor 3 transmitted by the motor pulse identifying circuit. The motor driving circuit receives a start/stop signal, as the case may be, through a switch located outside (not shown).

The inching control circuit regulates the rotation of the motor 6 when the operation of the motor has been shifted to the inching mode. This circuit receives a signal indicating that the motor 6 is locked, and then transmits a signal putting the motor into an inching mode. The emergency stop circuit stops the motor 6 in quick response to a signal showing an emergency transmitted by the motor driving circuit.

The grass mowers embodying the present invention has the three modes; that is, the light-load mode, the heavy-load mode, and the energy-saving mode, so as to constantly operate the operation division 3. In this sense, these modes can be generally termed "a constant operation mode. More specifically, the motor in the light-load mode rotates at constantly low speed with no break. This is the same with the heavy-load mode only with a difference in speed. In the energy-saving mode the power is intermittently supplied to the motor 6, and a pulsating voltage is applied thereto, but the operation division 3 continues to rotate.

In the inching mode the operation division is repeatedly started and stopped to the extent that the varying motion is sensibly identified through the sound and vibration of the motor 6, owing to the longer interval of time than in the energy-saving mode.

The inching rotation lasts for 0.1 to 0.5 sec. and the stopping period for 0.5 to 0.9 sec.

The grass mower 1 is operated at normal speed for regular use, but once the cutter is caught in cut pieces of grass, and stopped from rotation over a given period of time, preferably 0.5 to 1.5 sec., the expected inching operation is initiated.

Figure 4:
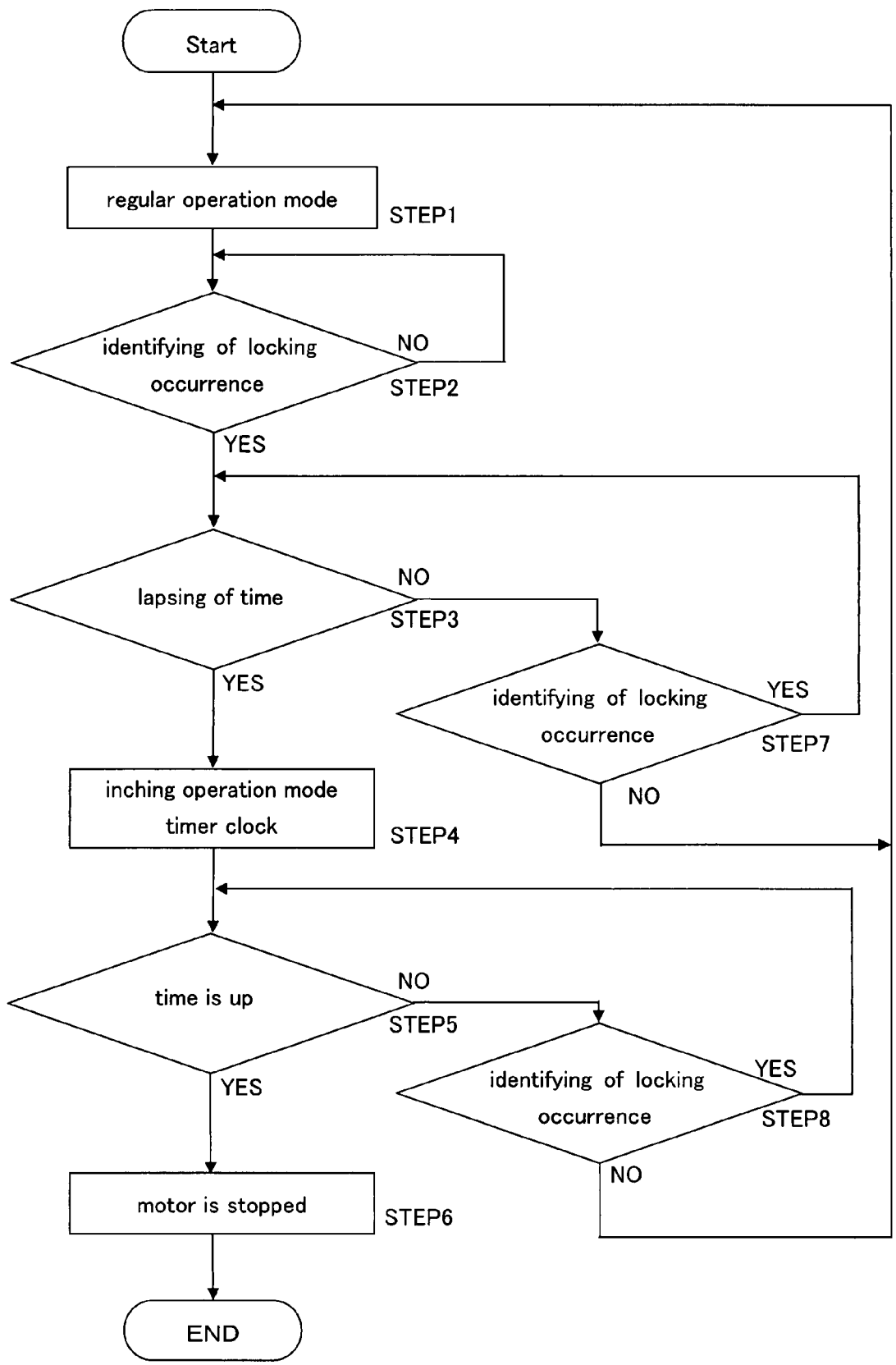
FIG. 4 is a flow chart illustrating the operation of the grass mower of FIG. 1.

In FIG. 4, Once the motor division 6 is started, the sequence advances to Step 1 where the regular speed operation is initiated in any selected mode from the light-load mode, the heavy-load mode or the energy-saving mode. At Step 2 the motor pulse identifying circuit in the control division tries to monitor any pulse signal from the motor 6, and if it is identified, it will operate to check if the motor 6 is actually locked; that is, if no signal is identified or a predetermined too few number of pulse signals is identified.

If no pulse signal is identified or an excessive few pulses are identified, the sequence advances to Step 3, where it is checked if the locking state continues over a predetermined period of time. Step 7 makes double check to see if the locking state continues and if no locking state is identified, the sequence returns to Step 1, and the regular operation resumes.

If the locking state continues over a predetermined period of time, the sequence advances to Step 4, and the operation is shifted to the inching mode, where the motor 6 is intermittently operated to the extent that the start and stop of the operation division can be sensibly discerned. At the same time, at Step 4 the timer starts to measure a time for which the inching operation continues.

When Step 5 has measured the predetermined period of inching time, the sequence advances to Step 6 where the motor 6 is stopped. The preferred period of time is in the range of 3 to 5 sec. Even if the inching continues longer than this period of time, it is least possible that the cutter is released from the tangled cut pieces of grass, and therefore, the motor 6 is stopped. Step 8 makes double check to see if the locking state continues during the inching operation, and if no locking state exists, the sequence returns to Step 1 where the regular operation resumes.

During the inching operation the power supply is intermittent for the motor 6, thereby minimizing the consumption of the battery by the motor 6. On the whole it leads to the saving of energy. The inching operation causes an irregular vibration of the motor 6 through which the operator can feel it and know that the cutter is locked. The operator can stop the motor 6 on his or her own.

What is claimed is:

1. A power-driven grass mower comprising:
   an operation division comprising a moving grass cutter; and
   a motor division comprising an electric motor through which the operation division is driven, the electric motor comprising a Hall element;
   wherein the grass mower further comprises a control division through which it is determined if the motor division is locked by detecting speed at which the electric motor operates based upon detection of pulse signals generated by the Hall element, the Hall element generating either: a) a predetermined too few pulse signals; or b) no pulse signals in the event that the motor division becomes locked, in response to which the motor division is placed into an inching operation mode,
   the motor division in the inching operation mode causing the grass cutter on the operation division to move in cycles wherein the operation division repeatedly starts and stops,
   the grass cutter being moved for 0.1 to 0.5 sec and stopped for 0.5 to 0.9 sec in each cycle.

2. The grass mower of claim 1, wherein the first means comprises means for causing the motor division to be put into the inching operation mode only when the motor division is locked for a predetermined period of time.

3. The grass mower of claim 1, wherein the first means comprises means for stopping the motor division when the motor division continues to be locked in spite of the motor division being put into the inching operation mode.

4. The grass mower of claim 1, further comprising a means for enabling an operator to identify that the motor division is in the inching operation mode.

5. The grass mower of claim 1, wherein the grass cutter comprises a rotary cutter.

6. The grass mower of claim 1, wherein the electric motor is battery operated.

7. The grass mower of claim 1, wherein the grass mower further comprises a front housing part and a rear housing part with the front housing part housing an input shaft.

8. The grass mower of claim 7, wherein the electric motor resides between the front and rear housing parts.

9. The grass mower of claim 7, wherein the electric motor is driven by a battery and the rear housing part resides between the electric motor and the battery.

10. The grass mower of claim 1, wherein with the motor division in the inching operation mode, the grass cutter is moved in one direction as the operation division repeatedly starts and stops.

11. The grass mower of claim 1, wherein the grass mower is portable and capable of being lifted and repositioned by an operator.

12. The grass mower of claim 1, wherein the grass mower comprises an elongate housing with spaced ends.

13. The grass mower of claim 12, wherein the grass cutter is at one end of the elongate housing.

14. The grass mower of claim 13, wherein the electric motor is driven by a battery that is at the other end of the elongate housing.

15. The grass mower of claim 1 wherein the electric motor is a brushless motor that rotates and generates pulses as a pulse signal, the number of pulses indicating rotational speed of the motor, and the control division comprises a. motor pulse identifying circuit that receives the pulse signal and counts the number of pulses to thereby check if the motor division is locked.

16. A power-driven grass mower comprising:
an operation division comprising a moving grass cutter; and
a motor division comprising an electric motor through which the operation division is driven, the electric motor comprising a Hall element;
wherein the grass mower further comprises a control division through which it is determined if the motor division is locked based upon detection of pulse signals generated by the Hall element, the Hall element generating either: a) a predetermined too few pulse signals; or b) no pulse signals in the event that the motor division becomes locked, in response to which the motor division is placed into an inching operation mode,
the motor division in the inching operation mode causing the grass cutter on the operation division to move in one direction in cycles wherein the operation division repeatedly starts and stops.

17. The grass mower of claim 16 wherein the grass cutter comprises a rotary cutter.

* * * * *